H. T. KRAKAU.
COUPLING.
APPLICATION FILED JUNE 24, 1909.
964,791.
Patented July 19, 1910.
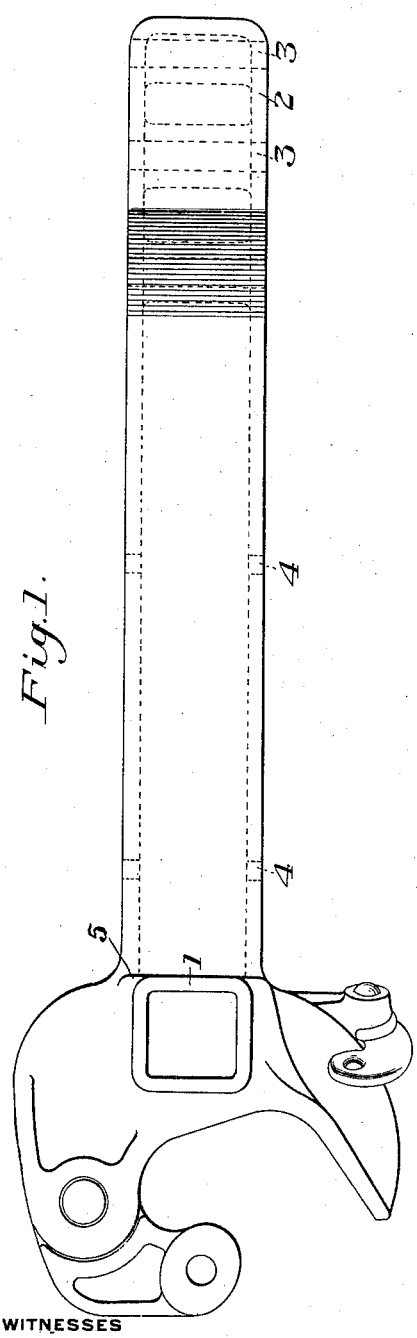
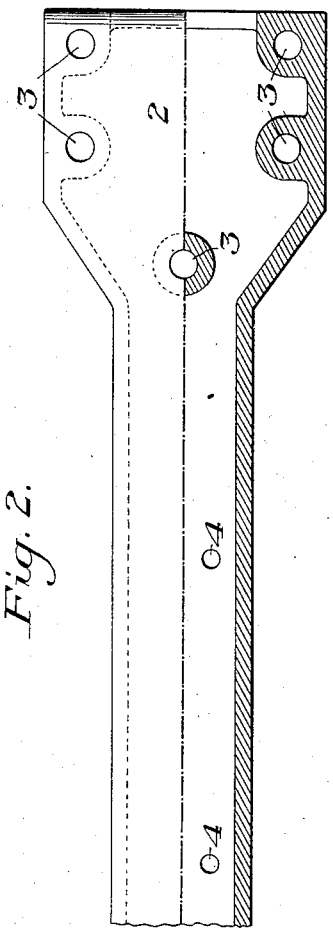
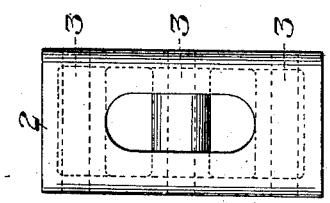
WITNESSES
INVENTOR

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

COUPLING.

964,791.  Specification of Letters Patent.  Patented July 19, 1910.

Application filed June 24, 1909. Serial No. 504,050.

*To all whom it may concern:*

Be it known that I, HARRY T. KRAKAU, of Cleveland, Cuyahoga county, Ohio, have invented a new and useful Improvement in Couplers, of which the following is a full, clear, and exact description, reference being had to the accompanying drawings, forming part of this specification, in which—

Figure 1 shows in plan view a coupler constructed in accordance with my invention; Fig. 2 is a side elevation partly in vertical section of the shank; and Fig. 3 is a rear end view of the shank.

As shown in the drawings, the coupler-head has on its top surface an upwardly projecting lug 1 extending upwardly above the buffer-horn 5 and having lateral bearing surfaces, and adapted to engage a slot or recess in the bottom of a buffer, so that when the coupler and buffer are mounted for radial movement the coupler shank and buffer-shank will be maintained in alinement during their lateral movements.

The coupler shank has at its rear end a vertically extending enlargement 2, provided with transverse holes 3 through which are passed the bolts by which the coupler shank can be attached to a rearwardly extending member or shank extension. The enlargement of the rear end of the coupler shank enables these holes to be spaced apart and to afford a very strong connection for the shank.

At the middle portion of the coupler-shank, I form holes 4 which are employed for the attachment of a wearing shoe to prevent wear upon the shank.

I claim:

1. A car coupler having a shank whose rear end portion is enlarged upwardly and downwardly, the enlarged portions being provided with horizontal bolt holes outside the lines of the forward portion of the shank; substantially as described.

2. A car coupler having a shank whose rear portion is provided with a vertically extending enlargement 2 provided with horizontal bolt holes 3 outside the lines of the forward portion of the coupler shank, the intermediate portion of said shank having horizontal holes 4 for attachment of a wearing shoe; substantially as described.

In testimony whereof, I have hereunto set my hand.

HARRY T. KRAKAU.

Witnesses:
HARRY E. ORR,
CHAS. E. POPE.